US008938807B1

(12) United States Patent
Huang et al.

(10) Patent No.: US 8,938,807 B1
(45) Date of Patent: Jan. 20, 2015

(54) MALWARE REMOVAL WITHOUT VIRUS PATTERN

(71) Applicants: Lung-Chu Huang, Taichung (TW); Ho-Hsuan Lee, Nantou (TW); Chung-Chih Hsieh, Taipei (TW)

(72) Inventors: Lung-Chu Huang, Taichung (TW); Ho-Hsuan Lee, Nantou (TW); Chung-Chih Hsieh, Taipei (TW)

(73) Assignee: Trend Micro Inc., Tokyo (JP)

( * ) Notice: Subject to any disclaimer, the term of this patent is extended or adjusted under 35 U.S.C. 154(b) by 171 days.

(21) Appl. No.: 13/663,406

(22) Filed: Oct. 29, 2012

(51) Int. Cl.
*G06F 11/00* (2006.01)
*G06F 21/56* (2013.01)

(52) U.S. Cl.
CPC .............. *G06F 21/568* (2013.01); *G06F 21/56* (2013.01); *G06F 21/564* (2013.01)
USPC .................................. 726/24; 726/12; 726/23

(58) Field of Classification Search
USPC ............................................... 726/12, 23, 24
See application file for complete search history.

(56) References Cited

U.S. PATENT DOCUMENTS

| 8,474,038 | B1* | 6/2013 | Wong | 726/22 |
| 2013/0067576 | A1* | 3/2013 | Niemela | 726/24 |
| 2013/0167236 | A1* | 6/2013 | Sick | 726/24 |

* cited by examiner

*Primary Examiner* — Teshome Hailu
*Assistant Examiner* — Abiy Getachew
(74) *Attorney, Agent, or Firm* — Beyer Law Group LLP

(57) ABSTRACT

Antivirus software detects malware on a computer and the landing time of the malware is determined; a time window around the landing time is determined. Optionally requiring the landing time of the malware to be before the installation time of the antivirus software eliminates false positives. Any files of the computer systems that have a creation time within the time window are suspect. If the prevalence value and the maturity value of the suspect file are below respective thresholds then it is concluded that the file is malware and it is deleted. No virus signature or virus pattern that matches the deleted file need be relied upon or used. The detected malware may be the original mother file or a dropped file. An online prevalence and maturity database is used. The launching time of the malware may be used instead of the landing time.

17 Claims, 8 Drawing Sheets

MALWARE REMOVAL SYSTEM

CHANGE JOURNAL EXAMPLE

PREVALENCE AND MATURITY EXAMPLE

PREVALENCE AND MATURITY EXAMPLE

MALWARE REMOVAL WITHOUT VIRUS PATTERN

FIELD OF THE INVENTION

The present invention relates generally to malware identification and removal. More specifically, the present invention relates to identifying malware without using a virus pattern.

BACKGROUND OF THE INVENTION

As is known in the art today, computer viruses, or in general, malware, are identified using virus signature matching or by a behavior-based heuristic technique. Virus signature matching requires analysis of known malware, development of malware signatures, and then deployment of the virus pattern file to customer sites. Behavior-based heuristic detection also requires a constant effort to identify the behavior of known and unknown malware, codifying that behavior into rules, and then deploying those rules to customer sites. In general, these approaches require constant effort to maintain protection.

The cost and effort for developing either signature-based or behavior-based patterns is increasing. This trend is perceived especially when a large amount of new malware is created by automation, by the technique of polymorphism, or by attacks of so-called zero day malware. This zero day malware can be difficult to detect the first day that it is introduced to the world as no pattern files have been developed for it and it may exhibit behavior that is new. Detection of this type of virus would be beneficial. Even known viruses can cause problems if they are not detected right away or if antivirus software is installed and operational after the virus has infected a computer. These known viruses (and also zero day malware) cause problems because they are often capable of creating other malicious files, known as dropped files, if the virus is not removed right away. These dropped files are problematic because while the original virus may eventually be removed because its virus signature is present in a virus pattern file, there may be no virus signature for the dropped files. Further, there may be no heuristics capable of detecting these dropped files. The dropped files may then cause damage to the user's computer.

Accordingly, an improved technique is desired that would be able to detect malware in general without the cost and effort of pattern creation, and that would specifically detect and remove dropped files from known and unknown computer viruses without using a virus pattern file.

SUMMARY OF THE INVENTION

To achieve the foregoing, and in accordance with the purpose of the present invention, a technique is disclosed that is able to detect and remove malicious software such as dropped files without using a virus pattern file. One advantage is that malicious software can be deleted without the need for an antivirus researcher to spend time analyzing the malicious software and to create a virus signature or a virus pattern file. Malware that is unknown, zero day malware, or malware for which a virus signature does not yet exist can be detected.

In a first embodiment, antivirus software is executed within a computer system and detects malware within the computer system. The landing time (creation time or modification time) of the malware application is determined and then a time window around the landing time is determined. Any files of the computer systems that have a creation time within the time window are suspect. If the prevalence value and the maturity value of the suspect file are below respective thresholds then it is concluded that the file is malware and it is deleted.

In a second embodiment, antivirus software is executed within a computer system and detects malware within the computer system. The landing time (creation time or modification time) of the malware application is determined and then a time window around the landing time is determined. The landing time of the malware application is before the installation time of the antivirus software in order to eliminate any false positives and to be efficient. Any files of the computer systems that have a creation time within the time window are suspect. If the prevalence value and the maturity value of the suspect file are below respective thresholds then it is concluded that the file is malware and it is deleted. Advantageously, no virus signature or virus pattern that matches the deleted file need be relied upon or used.

In a third embodiment, antivirus software is executed within a computer system and detects malware within the computer system. The launching time (beginning of process execution) of the malware application is determined and then a time window around the launching time is determined. Any files of the computer systems that have a creation time within the time window are suspect. If the prevalence value and the maturity value of the suspect file are below respective thresholds then it is concluded that the file is malware and it is deleted.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As mentioned above, a user computer may be infected by malware which then drops other malicious files. The original malware file might not have been detected initially because the antivirus software was installed after the computer became infected, or due to some other delay in detection. Once the antivirus software is installed the original malware may be detected and removed, but the dropped malicious files may not be detected because their signatures are not present in a virus pattern file.

Overview and Block Diagram

Figure 1:
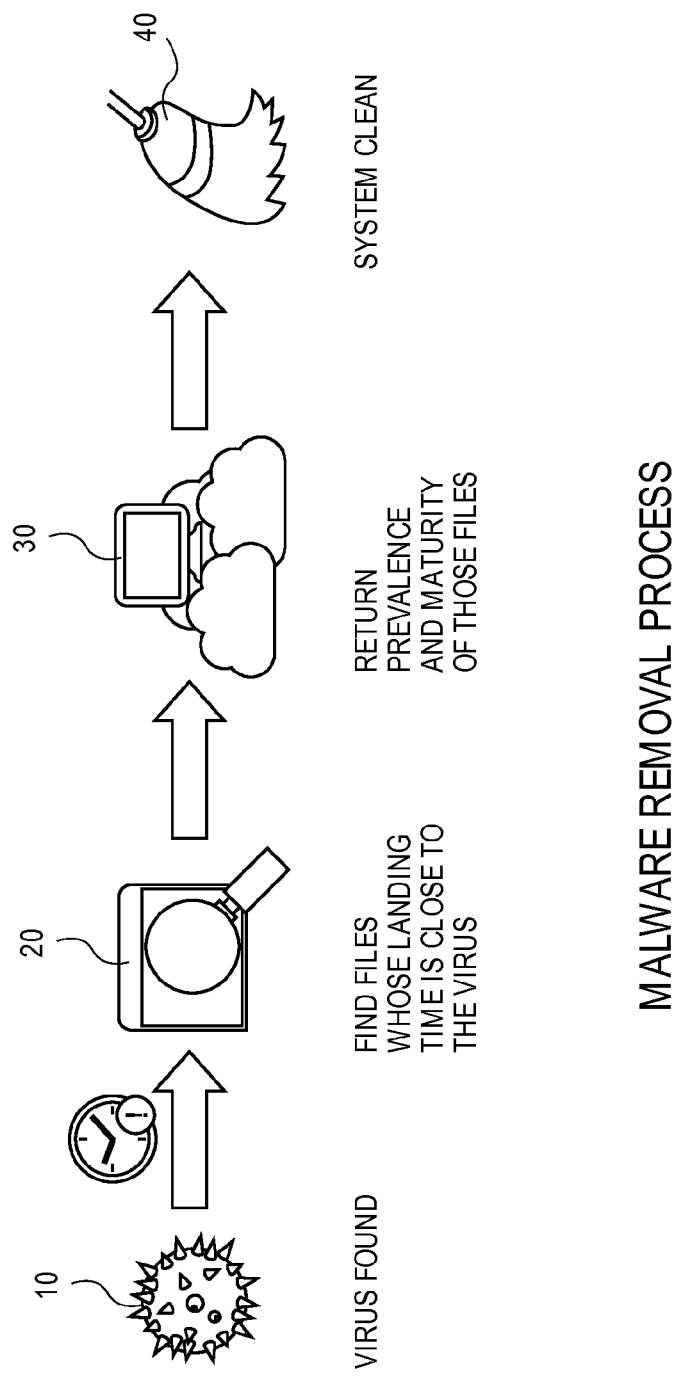
FIG. 1 illustrates an overview of a malware removal process that does not rely upon a virus pattern file.

FIG. 1 illustrates an overview of a malware removal process that does not rely upon a virus pattern file. In step 10 a computer virus or other malware is identified upon a user computer and the time of its infection is noted. Once this original virus has been detected, in step 20 other files on the computer are identified that were generated or modified around the same time as the original virus. Next, in step 30 a database is consulted to determine the prevalence and maturity of those identified files. Files that are relatively young and rare are suspicious and may then be deleted in step 40.

Figure 2:
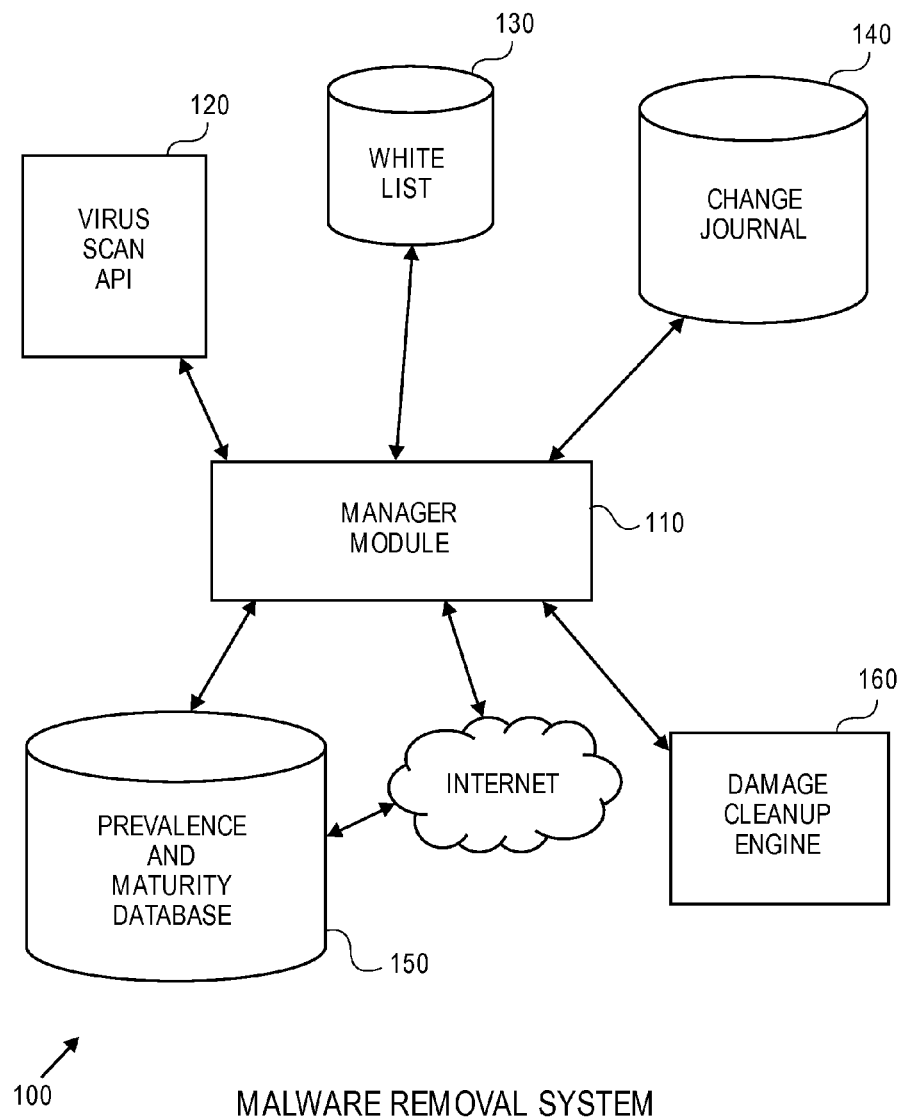
FIG. 2 is a block diagram of a malware removal system according to one embodiment.

FIG. 2 is a block diagram of a malware removal system 100 according to one embodiment. Included within this system is a manager software module 110 that controls the interactions between the other modules and databases shown. Module 110 is arranged to call or invoke the other software modules, retrieve information from the various databases, perform its own calculations or processes, and to generate a report. Module 110 may be written in the C/C++ computer language.

Virus scan API 120 is a software module or application programming interface capable of performing a scan of a user computer for viruses, worms, Trojans, etc. (in general, any malware) and may use techniques such as signature-based detection (i.e., virus pattern files), heuristic-based detection, or any other suitable technique. Once called by the manager module 110, module 120 may perform a real-time scan, a manual scan, an automatic scan at a particular time, or other. In one particular embodiment, module 120 is implemented using the VSAPI module available from Trend Micro, Inc. Other malware detection modules such as the DCE and SSAPI modules available from Trend Micro, Inc. may also be used.

White list 130 is any suitable database known in the art that includes identification of computer files that are known not to be malware. The change journal database 140 is any suitable database on the user computer that includes records identifying when the computer files, directories and other file system objects are created, deleted or modified, and the time of such creation or modification. Database 140 may be implemented in any suitable format including use of records, objects, a relational database, streams, etc. In one particular embodiment, a stream represents a particular volume or disk of the computer, and records are written to each stream as a change occurs. Each record specifies the file being changed, the type of the change, and a timestamp. In one specific embodiment, change journal database 140 is implemented using the Change Journal mechanism of the NTFS file system under the Microsoft operating system. An API exists by which the Change Journal may be accessed.

Prevalence and maturity database 150 is a single database (or two separate databases) that provide the prevalence and maturity for individual computer files. Database 150 may be located on the user computer or maybe accessible over the Internet on a cloud-based server computer as shown. The concept of prevalence of a computer file indicates historically how common the computer file is on a user computer, within a computer network, within an enterprise, or worldwide. How common a computer file is may be indicated by the number of copies of a computer file, on how many computers the computer file resides, the number of distinct owners of the computer file. The prevalence portion of database 150 may be queried by using the file name or unique identifier such as an MD5, the SHA-1, CRC or other. In general, computer files that are rare (i.e., have relatively fewer owners) may be deemed to be more suspicious. The prevalence portion of database 150 may be implemented by reference to the Census 2.0 database implemented by Trend Micro, Inc. The Census 2.0 database records the number of machines on which a particular computer file is present in order to indicate file prevalence. Although this database may record the number of machines worldwide, in one particular embodiment, the database records the number of machines running a particular antivirus software product worldwide that also include the particular computer file. This database is preferably accessed by providing both a file name and its SHA-1.

The concept of maturity of a computer file indicates how long the computer file has been in existence on the user computer, how long it has been in existence on any user computer, or how long since it has been last modified. The maturity portion of database 150 may also be queried by using the file name or unique identifier such as an MD5, the SHA-1, CRC or other. In general, computer files that are immature (i.e., have been in existence for a relatively shorter time than other computer files) may be deemed to be more suspicious. The maturity portion of database 150 may also be implemented by reference to the Census 2.0 database implemented by Trend Micro, Inc. The Census 2.0 database records how many days a file has existed in the database in order to indicate file maturity. This database is preferably accessed by providing both a file name and its SHA-1. Data on files is collected and stored in the prevalence and maturity database by the feedback mechanism of an anti-virus software product, such as the "Titanium" product available from Trend Micro. The Titanium product installed on user machines collects the file data from the user's machine in the course of execution and stores the data in the database.

The damage cleanup engine 160 is any suitable software module for removing or deleting suspected malware files and other artifacts of the malware. For example, when provided with an input file name, engine 160 is able to delete that file and related files, delete corresponding registry entries related to the input file name, and to kill any related processes. In one specific embodiment, module 160 is implemented using the Damage Cleanup Engine (DCE) available from Trend Micro Inc.

Figure 3:
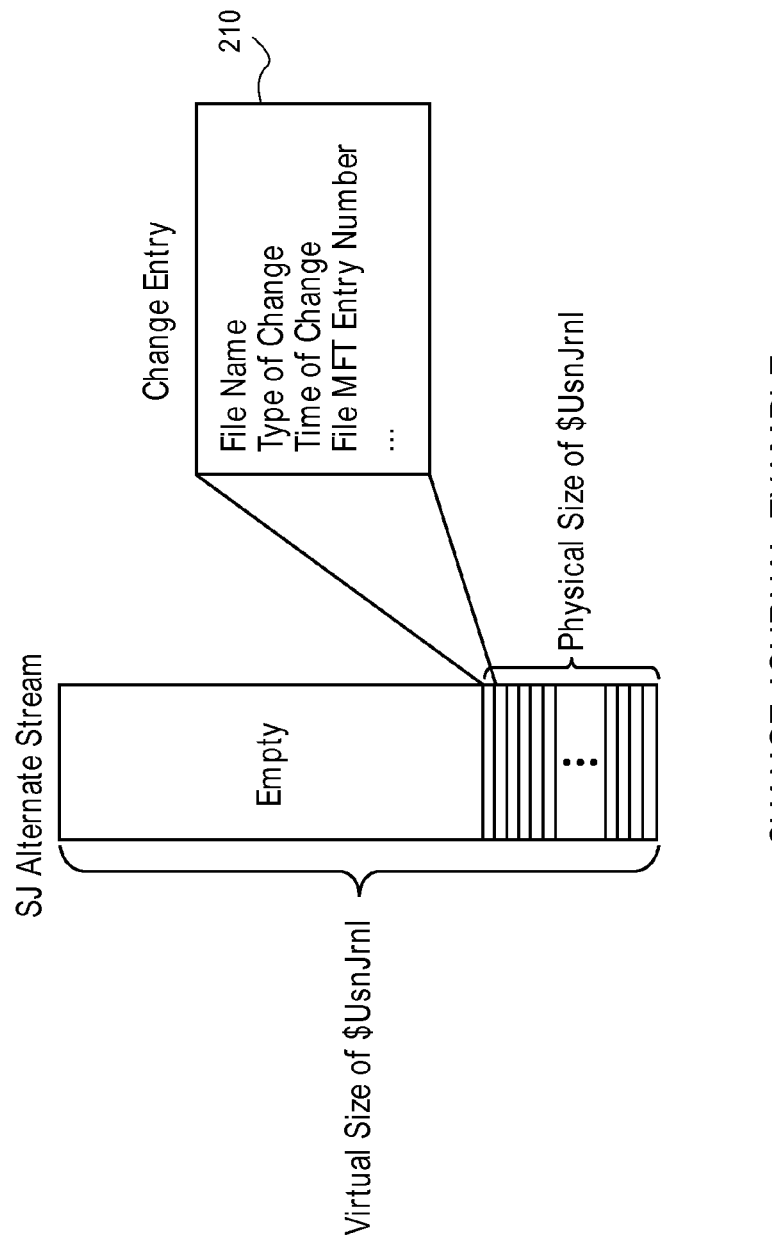
FIG. 3 illustrates an example of the Change Journal implemented under NTFS.

FIG. 3 illustrates an example of the Change Journal implemented under NTFS. As shown, a change entry 210 (a record) includes not only the file name and type of change, but also the time of the change. Accordingly, the change journal may be queried to provide the names of files on disk that have been changed within a particular time window.

Figure 4:
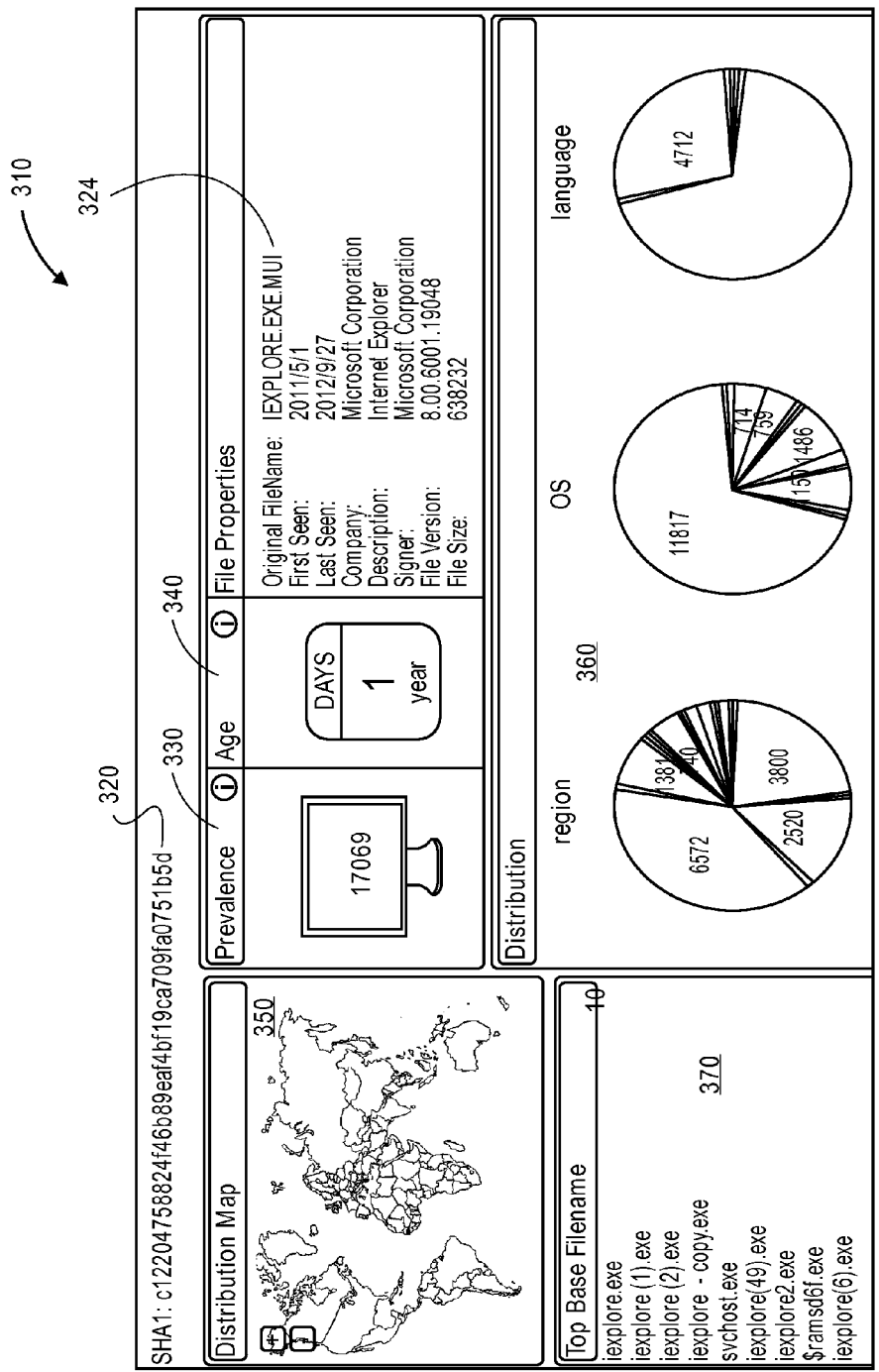
FIG. 4 is an example output from a record of the prevalence and maturity database.

FIG. 4 is an example output from a record of the prevalence and maturity database. As shown, a unique identifier 320 for a particular file (e.g., its SHA-1) has been used to retrieve information from the database. Shown is the file prevalence 330 indicating that there are over 17,000 computers worldwide having this file, the file age 340 indicating that the file has been in the database for at least one year, and various file properties including the file name 324. Also output is a file distribution map 350, a distribution 360 by region, operating system and language, and the top file names 370. The region chart indicates which user machines having the particular file are in which region. The operating system chart indicates which user machines having the particular file are using which operating system. The language chart indicates which the user machine having the particular file are using which operating system language. The Top Base File Name indicates which are the most commonly used file names for this particular file. It is likely that the described file being very prevalent and relatively old will be deemed not to be a threat.

Figure 5:
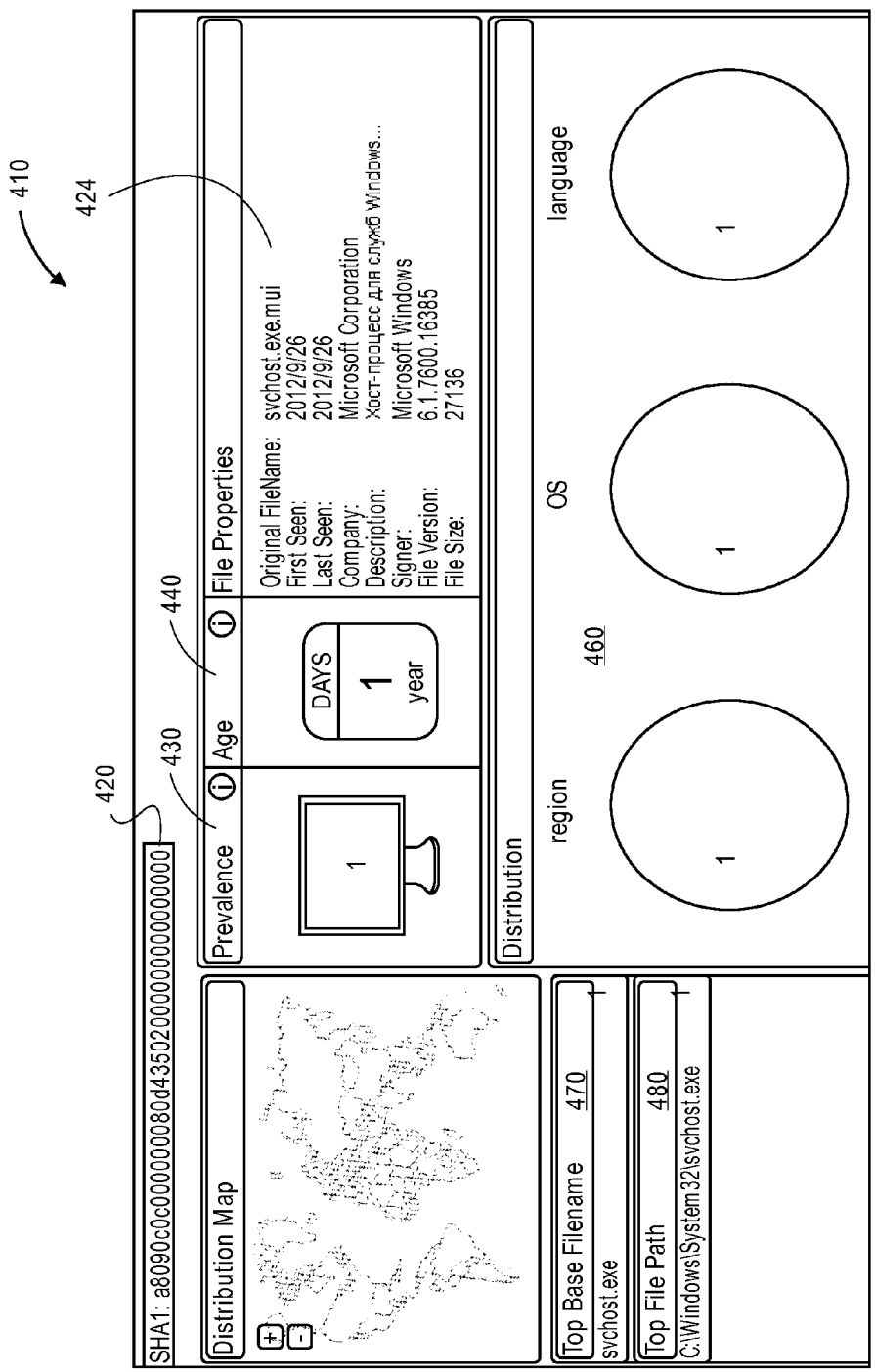
FIG. 5 is an example output from another record of the prevalence and maturity of database.

FIG. 5 is an example output from another record of the prevalence and maturity of database. As shown, a unique identifier 420 for a particular file (e.g., its SHA-1) has been used to retrieve information from the database. Shown is the file prevalence 430 indicating that there is only one occurrence worldwide of this file, the file age 440 indicating that the file has been in the database for only one day, and various file properties including the file name 424. Also output is a distribution 460 by region, operating system and language, the top file names 470, and the top file path 480. The Top File Path indicates which are the most commonly used full file paths for this particular file. It is likely that the described file will be deemed to be malware because it is extremely rare and extremely young.

Flow Diagrams

Figure 6A:
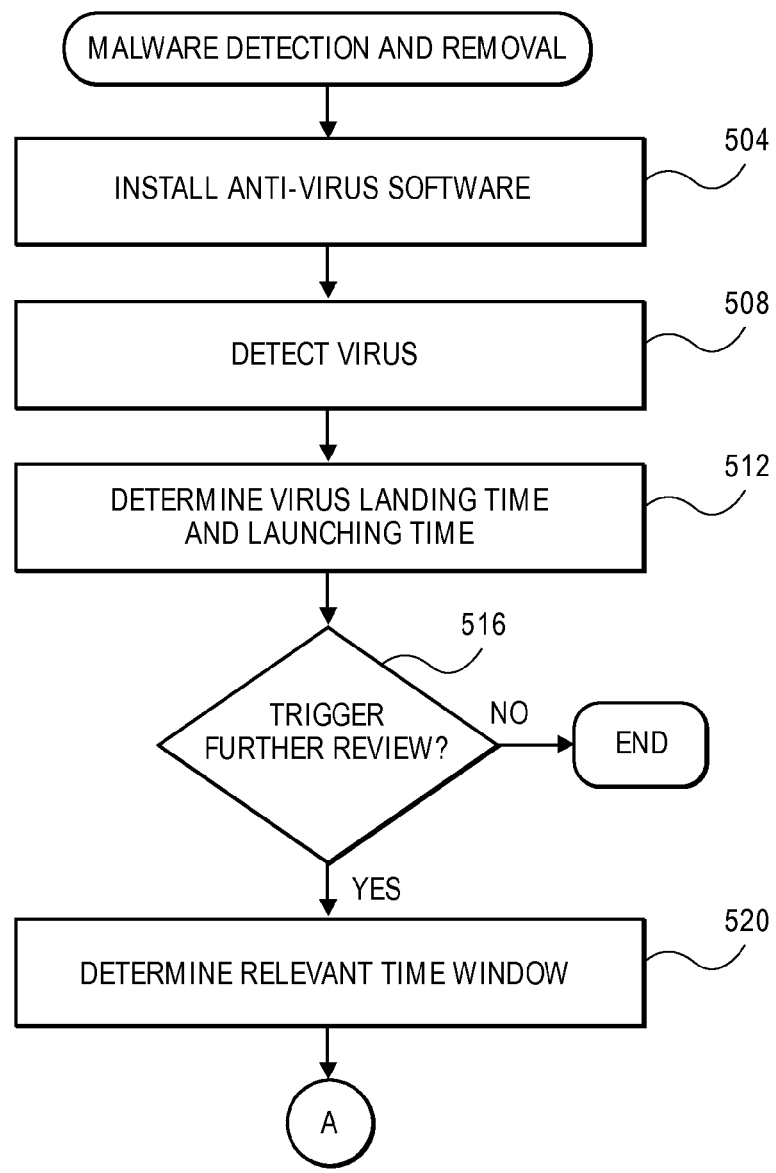
FIGS. 6A and 6B are a flow diagram describing one embodiment by which certain malware is detected and removed without needing to use a virus pattern file to detect and remove that malware.
Figure 6B:
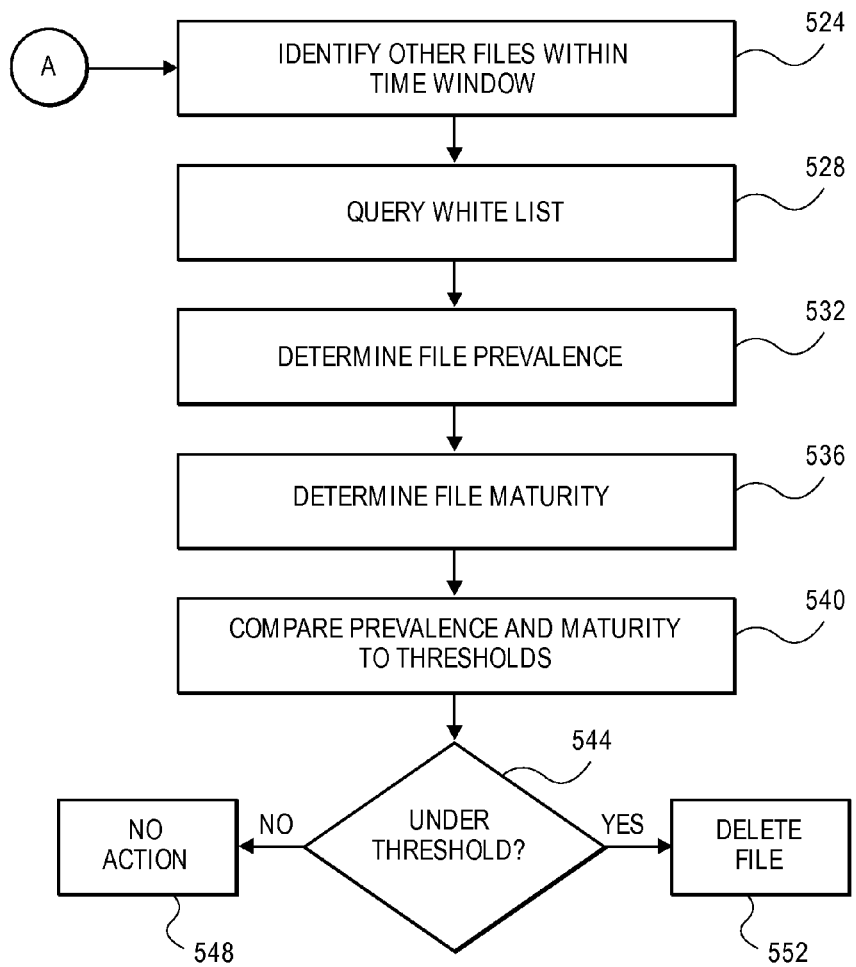

FIGS. 6A and 6B are a flow diagram describing one embodiment by which certain malware is detected and removed without needing to use a virus pattern file to detect and remove that malware. Except where otherwise mentioned, the below steps may be implemented under control of manager module 110.

As alluded to above, it is possible that malware may infect a user computer at any time. It can be problematic if malware infects a computer before any antivirus software product is installed because the malware may then drop any number of other malicious files. Once the antivirus software is installed, it may detect and delete the original malware, but the dropped malicious files may not be represented in a virus pattern file and thus will not be detected and deleted.

It is also possible that antivirus software is installed on the user computer and that the computer is infected with malware after that time, but that the malware cannot be detected because the antivirus software is incapable of detecting it or because the virus pattern file used does not have any corresponding virus signature able to detect the malware. It is also possible that malware infects the user computer after antivirus software is installed, but that even if the original malware is detected by the antivirus software that any malicious files dropped by the malware may not be detected because there is no virus signature that matches the dropped malicious files.

Accordingly, in step 504 at some point in time antivirus software is installed upon the user computer and begins execution. In step 508 the antivirus software detects a computer virus (or other type of malware) on the computer. The antivirus software may use any technique to detect the malware such as signature-based detection, heuristic detection or any other suitable technique. Even though the antivirus software may use a virus pattern (including many virus signatures) to detect this original malware, there may be other malicious files dropped by this original malware for which a virus pattern does not exist or is not being used on the user computer. In any case, even if a virus pattern exists external to the user computer that is capable of detecting these other dropped malicious files, the present invention as described below is capable of detecting and deleting these other dropped malicious files without the use of such a virus pattern. Furthermore, any heuristic-based detection techniques would likewise not be needed to detect and delete these other malicious files.

Once the original virus is detected, in step number 512 the landing time and launching time of this virus is determined. The landing time of the virus refers to when the virus was created on the user computer or when it was last modified. In a preferred embodiment, the landing time is determined by taking the later of the creation time and the modification time. Also relevant is the launching time of the virus which refers to the time when a process initiated by the virus first starts executing on the user computer. Because it is likely that malicious files dropped by the virus are created close in time to when the virus is first created, last modified or starts executing, these landing and launching times will be helpful in finding any dropped files. In one embodiment, the operating system records when a process is launched and we can retrieve that data from the operating system. The process launch time can be used as well as the file landing time to form a time window. Any file created or modified near the process launch time or near the file landing time may be treated as suspicious and will trigger further review. In other words, two time windows may be used, one surrounding the process landing time and one surrounding the process launch time.

Because there is a risk that the present invention may detect false positives, an optional step 516 may be implemented in order to reduce these false positives. For example, the invention may only be enabled if a full scan had been executed because there are very few users who will typically execute a full scan. If a full scan had not been executed then the process may end. Or, if it is believed that the antivirus software installed in step 504 is capable of detecting and deleting immediately any virus installed after the antivirus software has been installed, then the present invention need only be used if the landing or launching time of the virus is before the antivirus software had been installed. Accordingly, if the landing or launching time of the virus is not before installation of the antivirus software, then the process may also end. A virus that lands or launches before installation of the antivirus software is more of a risk because it may have dropped other malicious files that cannot be detected, even though the antivirus software may eventually delete the original virus file. Further review may also be triggered for those viruses whose detection times are close to their landing times during a real-time scan.

In any case, if further review is warranted and there are no limitations that would cause the process to end, then in step 520 the relevant time window or windows are determined. In order to locate any files possibly dropped by the original virus, a window of time around both the landing time and the launching time is determined. A configurable length of time is used to create the time window. For example, a time window of approximately 20 minutes is determined by using a length of time of approximately ten minutes both before the landing time and after the landing time. Of course, the configurable length of time may range from any value on the order of seconds up to minutes and even hours or days. While it is important to have a time window that extends after the virus landing time, it is also important to have a time window that extends before the virus landing time. The reason is because while it is believed that the virus detected in step 508 is the original virus or so-called mother virus (meaning that any files it drops will necessarily be dropped after it lands), it is possible that the virus detected in step 508 is potentially the second or third malicious file dropped by the original virus. In this situation it is possible that the original virus went undetected and only one of the latter dropped files has been detected. Accordingly, it is possible that the original virus and other dropped files have creation dates before the landing time of the virus detected in step 508. So, while the antivirus software was successful in detecting the original virus or one of its dropped files, it patterns or heuristics may have been unsuccessful in detecting other dropped files or even the original virus file. As mentioned, two time windows may be determined, one around the landing time and the other around the launching time. The launching time window is used because a malware process will start to drop files once it is launched. So, the dropped file landing time may be close to the malware process launch time. Both the launching time and landing time can be used, and either one matching will trigger further review.

Once a time window or windows has been determined, in step 524 any other files are identified on disk on the user computer that fall within the time window or time windows. In other words, any file on the hard disk of the computer that was either created within the time window or was modified within the time window is identified. These files may be identified using any suitable mechanism within the computer operating system that allows file creation or modification times to be determined. For example, any suitable change journal implemented by the computer operating system may be used. In one specific embodiment, module 110 accesses the Change Journal under NTFS in the Microsoft operating system using an API call in order to determine any files that fall within either of the time windows.

Next, as an optional step 528, these files identified in step 524 may be further screened to exclude any files that are likely not malware in order to avoid false positives. For example, each file name (or unique identifier such as a message digest or SHA-1) may be sent to a white list 130 in order to determine if the file is known to be benign. Or, files may be excluded from further analysis if they belong to the common cache or are part of an exclusion configuration. When a file is in the common cache it means that the file has already been scanned and the file has been signed by a trusted authority. The exclusion configuration is typically a user-defined white list. Files in the exclusion configuration will be excluded from further analysis. Any files screened out in step 528 will be excluded from further analysis.

In step 532 the prevalence of each file identified in step 524 (and not screened out) is determined. As mentioned above, the prevalence of the file indicates how common the file is, whether that be within a particular network, within a group of computers, within an enterprise, worldwide, among a particular group of computers, etc. The particular group in which the occurrence of the file is determined is a configurable setting that may be left up to the user. In one particular embodiment, the prevalence of the file is determined based upon the number of individual end-user computers that include at least one copy of that file. The prevalence database 150 is preferably implemented on a cloud-based server as a backend service. The input provided to the database may be the name of the file or its SHA-1 (or preferably, both) and the output received from the database will be an integer indicating the prevalence of that particular file (e.g., how many end-user computers have a copy of that file). If the file is not present in the database then a value of zero will be returned. In general, the lower the prevalence value the more suspicious the file is.

In step 536 the maturity of each file identified in step 524 (and not screened out) is determined. As mentioned above, the maturity of the file indicates how long the file has been in existence. Maturity may be determined based upon how long a particular file has existed within the maturity database 150, based upon the earliest creation date of a file within the database, or using other criteria. The particular criteria used is a configurable setting that may be left up to the user. In one particular embodiment, the maturity of the file is determined based upon how long the file existed within the database. The maturity database 150 is preferably implemented on a cloud-based server as a backend service. The input provided to the database may be the name of the file or its SHA-1 (or preferably, both) and the output received from the database will be a number indicating how long that particular file has existed within the database (e.g., a number indicating hours or days). If the file is not present in the database then a value of zero will be returned. In general, the lower the maturity value the more suspicious the file is. In one particular embodiment, both the prevalence and maturity databases are located together and are implemented in an online software module known as Census 2.0 available from Trend Micro, Inc.

In step 540 both the returned prevalence and maturity values for a suspect file are compared to prevalence and maturity thresholds. For example, the prevalence threshold may be set to five, and any file having a prevalence value less than five may be considered suspicious. In another example, the maturity threshold may be set to five hours and any file having a maturity value less than five hours may also be considered suspicious. Of course, these prevalence and maturity thresholds may have a wide range of values that are configurable by the user. In step 544 it is determined whether the prevalence and maturity values for a particular file warrant that no action be taken (in step 548) or that the file be deleted (in step 552). A determination as to whether the file be deleted may depend upon whether one or both of the values are below threshold, whether one value is far below the threshold, or a combination of these determinations. In one particular embodiment, if both values are below their thresholds then in step 552 the suspicious file is deleted.

The suspicious file may be deleted by calling damage cleanup engine 160 which may take action such as deleting the suspect file and any related files, deleting related registry entries, or killing related processes. Advantageously, this suspicious file (or suspicious files) identified in step 524 is determined to be malware and deleted based upon the time window, file prevalence and file maturity. It is not necessary to use any virus pattern, virus signature or heuristics in order to identify and delete these files.

Once a determination is made as to whether no action should be taken or the file should be deleted, a report may be sent from manager module 110 to any antivirus product being used, to the user, to a database, or to any central server. The report may include threat type ("suspicious"), threat name, the file full name, detection time, action type, and action result.

Computer System Embodiment

Figure 7A:
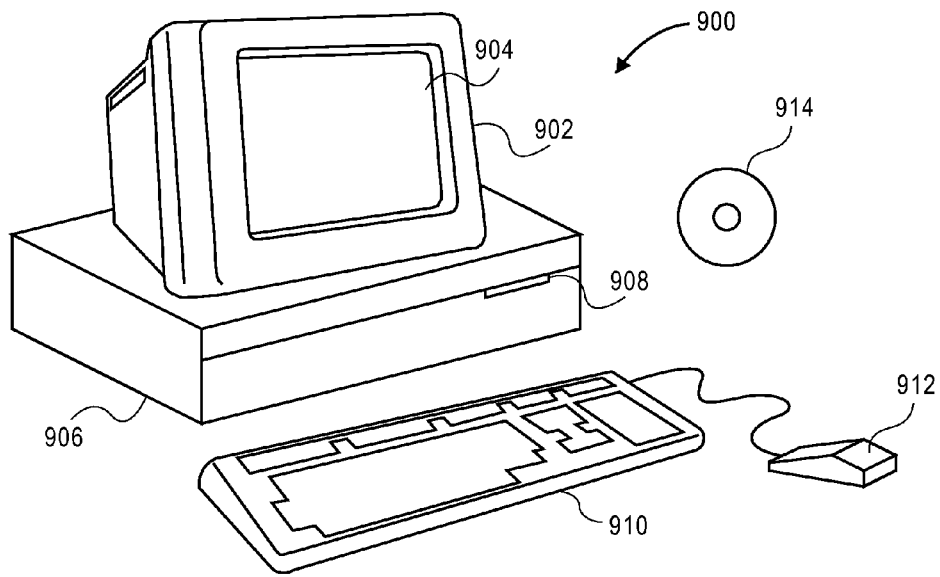
FIGS. 7A and 7B illustrate a computer system suitable for implementing embodiments of the present invention.
Figure 7B:
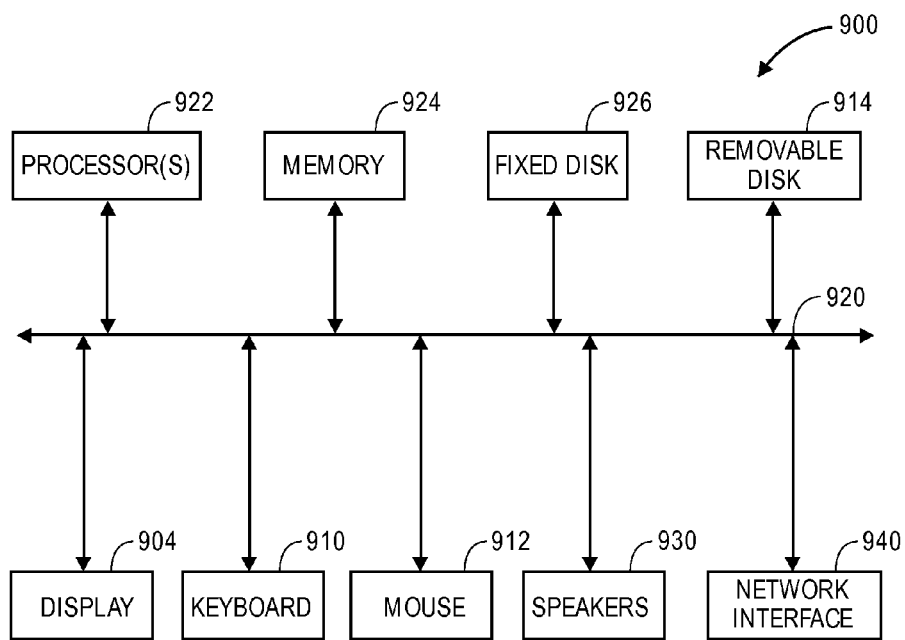

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of deleting malware, said method comprising:
   executing an antivirus software application within a computer system;
   detecting a malware application within said computer system using said antivirus software; and
   identifying and deleting a malicious file dropped into the computer system by said malware application without relying upon any virus signature that identifies said malicious file as being malware, including:
   determining a landing time of said malware application;
   determining a first time window around said landing time;
   identifying a file within said computer system having a creation time within said first time window;
   comparing a prevalence value of said file and a maturity value of said file with respective prevalence and maturity thresholds; and
   deleting said file based on said comparisons.

2. The method as recited in claim 1 further comprising:
   determining that said prevalence value is below said prevalence value threshold and that said maturity is below said maturity threshold.

3. The method as recited in claim 1 further comprising
   determining a launching time of said malware application;
   determining a second time window around said launching time;
   identifying said file within said computer system having a creation time within said first time window or within said second time window.

4. The method as recited in claim 1 wherein said landing time of said malware application is before an installation time of said antivirus software.

5. The method as recited in claim 1 further comprising:
   determining that said file is malware without using a virus signature corresponding to said file.

6. The method as recited in claim 1 wherein said creation time of said file is before said landing time of said malware application.

7. A method of deleting malware, said method comprising:
   executing an antivirus software application within a computer system;
   detecting a malware application within said computer system using said antivirus software; and
   identifying and deleting a malicious file dropped into the computer system by said malware application without relying upon any virus signature that identifies said malicious file as being malware, including:
   determining a landing time of said malware application that is before an installation time of said antivirus software;
   determining a first time window around said landing time;
   identifying a file within said computer system having a creation time within said first time window;
   comparing a prevalence value of said file and a maturity value of said file with respective prevalence and maturity thresholds and determining that said file is malware; and
   deleting said file, wherein said file is deleted without relying upon any virus signature that identifies said file as being malware.

8. The method as recited in claim 7 further comprising:
   determining that said prevalence value is significantly below said prevalence threshold.

9. The method as recited in claim 7 further comprising
   determining a launching time of said malware application;
   determining a second time window around said launching time;
   identifying said file within said computer system having a creation time within said first time window or within said second time window.

10. The method as recited in claim 7 wherein said creation time of said file is before said landing time of said malware application.

11. The method as recited in claim 7 further comprising:
    determining that said maturity value is significantly below said maturity threshold.

12. A method of deleting malware, said method comprising:
    executing an antivirus software application within a computer system;
    detecting a malware application within said computer system using said antivirus software; and
    identifying and deleting a malicious file dropped into the computer system by said malware application without relying upon any virus signature that identifies said malicious file as being malware, including:

determining a launching time of said malware application;

determining a first time window around said launching time;

identifying a file within said computer system having a creation time within said first time window;

comparing a prevalence value of said file and a maturity value of said file with respective prevalence and maturity thresholds; and deleting said file based on said comparisons.

13. The method as recited in claim 12 further comprising: determining that said prevalence value is below said prevalence value threshold and that said maturity is below said maturity threshold before deleting said file.

14. The method as recited in claim 12 further comprising determining a landing time of said malware application; determining a second time window around said landing time;

identifying said file within said computer system having a creation time within said first time window or within said second time window.

15. The method as recited in claim 12 wherein said launching time of said malware application is before an installation time of said antivirus software.

16. The method as recited in claim 12 further comprising: determining that said file is malware without using a virus signature corresponding to said file.

17. The method as recited in claim 12 wherein said creation time of said file is before said launching time of said malware application.

\* \* \* \* \*